Jan. 19, 1965          C. L. SMITH                3,165,947
             REVERSIBLE DRIVE FOR POWER TOOLS
Filed May 9, 1960                           3 Sheets-Sheet 1

INVENTOR.
CHARLES L. SMITH
BY
John J. McLaughlin
ATTORNEY

INVENTOR.
CHARLES L. SMITH

BY *John J. McLaughlin*
ATTORNEY

Jan. 19, 1965
C. L. SMITH
3,165,947
REVERSIBLE DRIVE FOR POWER TOOLS
Filed May 9, 1960
3 Sheets-Sheet 3
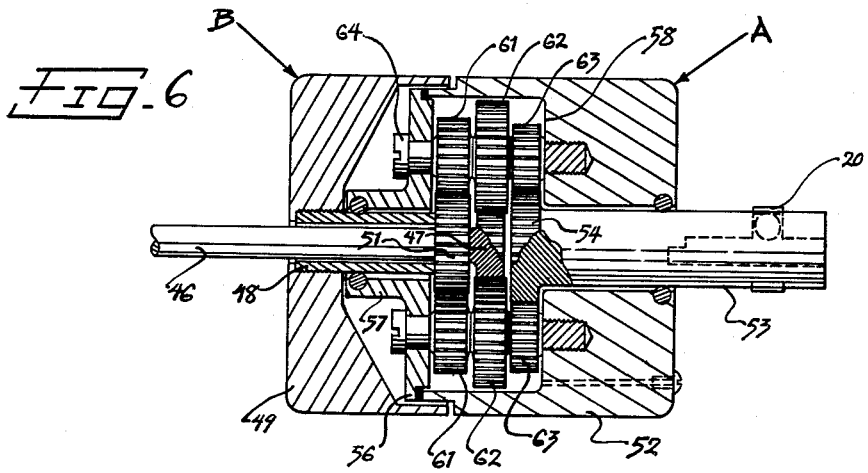
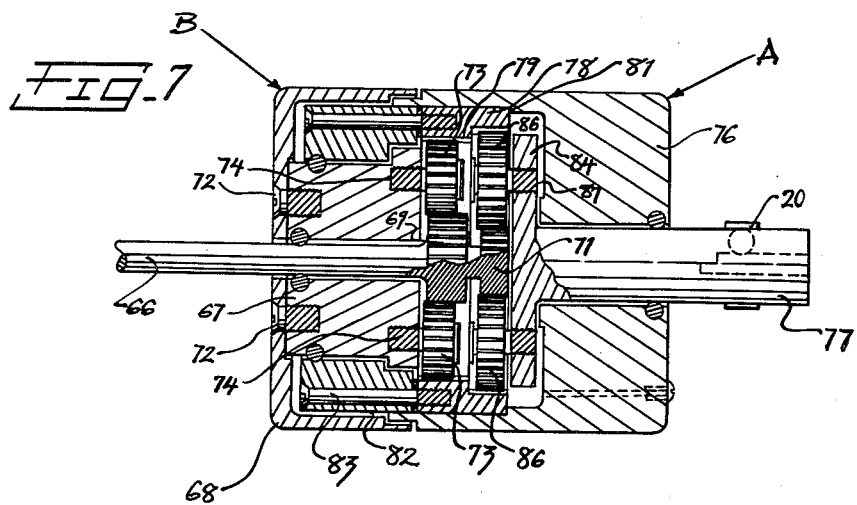
INVENTOR.
CHARLES L. SMITH
BY
ATTORNEY United States Patent Office 3,165,947
Patented Jan. 19, 1965

3,165,947
REVERSIBLE DRIVE FOR POWER TOOLS
Charles L. Smith, 2214 E. Towner St., Tucson, Ariz.
Filed May 9, 1960, Ser. No. 27,640
4 Claims. (Cl. 74—760)

My invention relates in general to reversible drives for power tools. It relates more in particular to a reversible drive for power tools provided with a two part housing or the like in which the drive is in one direction when one portion of the housing is braked and in the opposite direction when the other portion of the housing is braked.

While the invention is primarily concerned with portable transmissions operable with power tools such as drills, screw drivers and the like, which conventionally are designed to drive only in a single direction, it may have other utility in that it may comprise a part of the tool rather than an attachment. For convenience of description the invention will be referred to throughout as if it were an attachment to convert power from a portable electric drill motor for example to other functions such as turning screw drivers, tightening bolts, tapping and threading and the like functions.

The principal object of the present invention is the provision of an improved readily reversible drive for portable hand tools.

Another object is the provision of a drive for portable hand tools which may have any desired drive ratio when operating in either forward or reverse relation with respect to the power input.

Still another object of the invention is the provision of a reversible drive for power tools having an input and output shaft and in which the functions of such shafts may be reversed without adjustment of the transmission mechanism.

A further object of the invention is the provision of a lightweight reversible drive for power tools which is instantly adjustable to provide forward or reverse drive without any prior adjustment of the tool itself.

Other specific objects and features of my invention will be apparent from the following detailed description taken with the accompanying drawings, wherein, FIG. 1 is an isometric view showing one form which my invention may take and illustrating one manner of its use;

Figure 3:
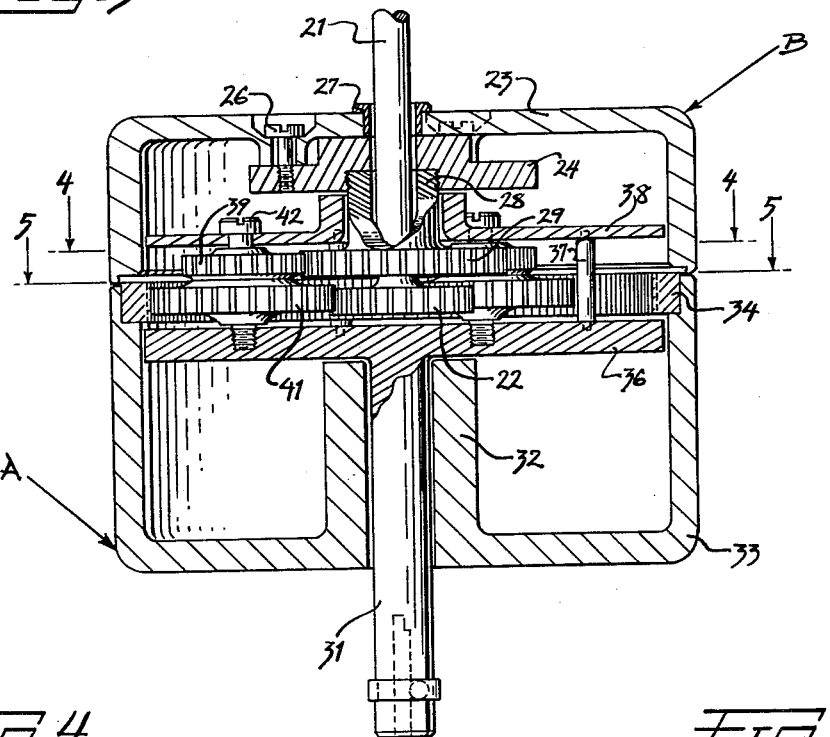
FIG. 3 is a longitudinal sectional view showing one form of the tool of my invention.
Figure 4:
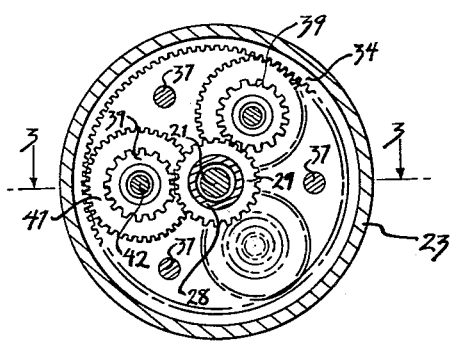
Figure 5:
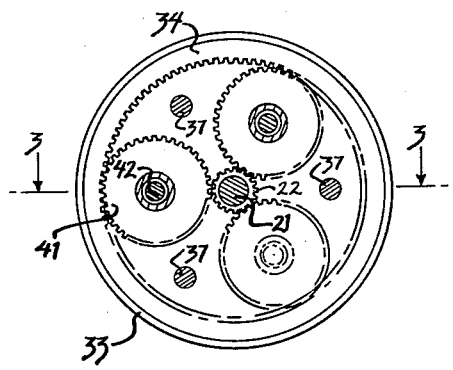

FIGS. 4 and 5 are transverse sectional views taken on the lines 4—4 and 5—5 respectively of FIG. 3;

FIG. 6 is a view similar to FIG. 3 but showing the preferred embodiment of the invention;

FIG. 7 is a view similar to FIGS. 3 and 6 showing still another embodiment.

A common feature of all embodiments of my present invention is the provision of a two part housing through one part of which an input shaft is journaled and through the other of which an output shaft is journaled. The input shaft carries an integral drive gear and at least one planetary gear system. The planetary gear system is so connected between the input shaft gear and the output shaft that holding one housing part against movement will cause the output shaft to be driven in one direction, and holding the other housing part against movement will cause the output shaft to be driven in the opposite direction. More specifically in a preferred arrangement if the housing part in which the output shaft is journaled is held against rotation, the output shaft is caused to move in a forward direction; but if the housing part in which the input shaft is journaled is held against rotation, the output shaft is caused to rotate in a reverse direction. While I utilize at least one planetary gear system between the driving shaft and driven shaft, I may or may not employ a ring gear; but when such ring gear is employed it is rigid with the housing part in which the output shaft is journaled.

While the specific gear ratios and distribution used cause the reversible drive of the present invention to impart either forward or reverse rotation to the output shaft depending upon which housing part is braked, the gearing may also be controlled to vary the output shaft speed with respect to the input shaft speed. While control of the relative speed of the input and output shafts is a function of design, and in a given design cannot be controlled, this feature of the invention as applied to the reversing feature is a particularly advantageous feature when a relatively high speed hand motor is being used for operations requiring lower normal speeds.

Figure 1:
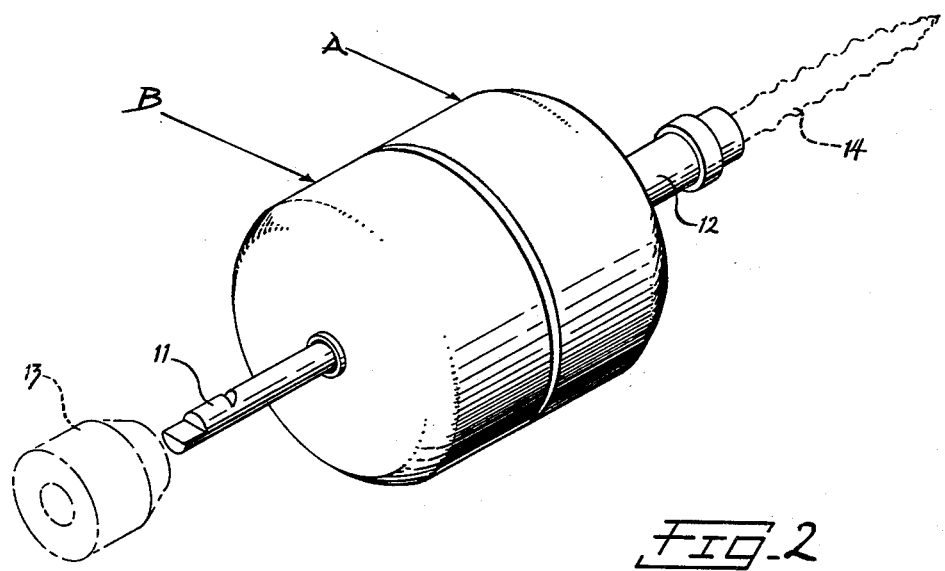

As indicated in FIG. 1, the device of the present invention includes a forward housing A and a rear housing B with an input shaft 11 and output shaft 12, the terms "forward" and "rear" being used to identify location with respect to the operation during normal use. As shown, the input shaft is secured in a jaw chuck 13 such as of a small electric hand drill, and the output shaft illustratively carries a tap 14 used for applying threads to a previously drilled hole.

Figure 2:
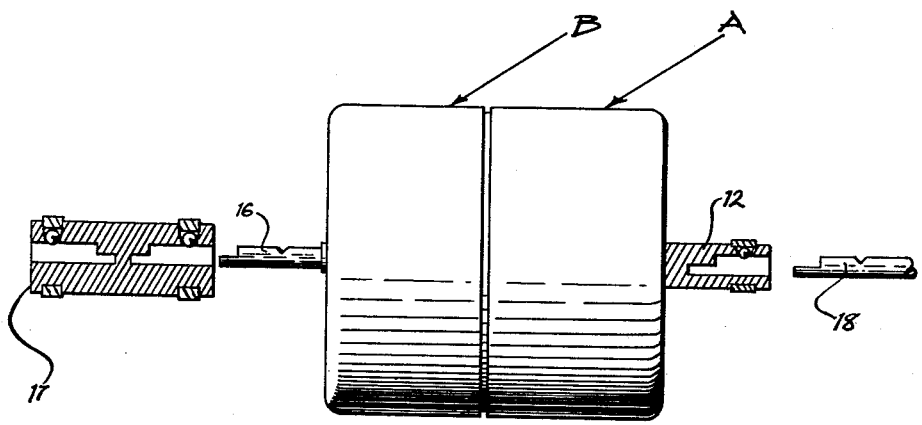
FIG. 2 is an elevational view showing the use of adapters indicating the manner in which the tool may be driven from either end.

For modified use to reverse the input and output shafts, I may provide a specially designed input shaft 16 with an adapter 17 together with an output shaft adapter 18 as shown in FIG. 2. If desired for any reason, such as to take advantage of a special gear ratio in a particular unit, the tool may thus be driven from the opposite end than that for which it was primarily designed. This ability to drive from either end is a feature of the present invention, and for this reason where I refer to input shaft and output shaft it should be understood that these words are used descriptively and not in a limiting sense. While each of the embodiments of the invention may be considered as involving an input shaft and an output shaft, each journaled in a housing part, and the planetary gearing between the shafts so constructed and arranged that when the forward housing part is held stationary the output shaft is driven in a forward direction and when the rear housing portion is held stationary the output shaft is driven in a reverse direction, there is a common feature of all embodiments such that there are four distinctly separate sections tied together as will be explained, a feature which runs through all embodiments of the invention and is characteristic of it. For convenience and to illustrate the common denominator among the embodiments reference will be made to these four sub-assembly areas each of which moves as a unit.

Looking now first to FIGS. 3, 4 and 5, the input shaft 21 is journaled in the rear housing and carries on its forward end a driving gear 22. Input shaft 21 and driving gear 22 can be thought of as comprising one sub-assembly. The rear housing includes a cup shaped portion 23 on the inside of which a face plate 24 is attached by screws 26. By removing the screws 26, the cup shaped portion 23 can be removed to expose the remaining portion of the parts within the housing. An axial bearing 27 may be provided and it may be provided with an oil seal. A sleeve 28 coaxial with shaft 21 is held by threads to the face plate 24 and carries an integral sun gear 29. The sleeve 28 is in effect, therefore, the hub of the gear 29 and the gear 29 with its integral sleeve 28, face plate 24 and cup shaped portion 23 move as a unit and define a second sub-assembly.

The output shaft 31 is journaled in an inner annular projection 32 on the cup shaped portion 33 comprising the forward housing. The housing portion 33 carries a ring gear 34 which is aligned with the driving gear 22 which in turn is integral with input shaft 21. The annular projection 32, the cup shaped portion 33 and the ring gear 34 comprise a sub-assembly since all of these parts move as a unit.

A face plate 36 is integral with the inner end of output shaft 31 and this face plate carries a plurality of spacing studs 37 which support a second plate 38 in spaced but parallel relation to the face plate 36. Pairs of planetary gears 39 and 41 respectively are secured between the plate 38 and the face plate 36 by cap screws 42, the two gears 39 and 41 having a common hub and, therefore, being integral with each other. As shown particularly in FIGS. 4 and 5, the planetary gears 41 mesh with both the driving gear 22 and the ring gear 34; while the smaller gear 39 of the two planetary gears meshes with concentric gear 29 which is a part of the rear housing sub-assembly. Thus, the output shaft 31, face plate 36, spaced plate 38 and the three sets of planetary gears (each set having a gear 39 and 41) move as a unit and can be thought of as the fourth sub-assembly of the device.

As already explained, the forward housing assembly A is held if the output shaft is to be driven in a forward direction, but the rear housing portion B is held if the drive is to be in the reverse direction. The mechanical manner in which this function is accomplished is through the interaction of the gear system described. Thus, when the forward housing assembly A is held, the ring gear 34 is kept from rotating and since the planetary gears 41 are in mesh with the driving gear 22 they are forced to move with respect to the ring gear and thus rotate or orbit around the sun gear 22. As the gears 41 move, they carry the face plate 36 with them. The gear train and ratios are such that movement of the face plate 36 imparted to it by the movement of the gears 41 is at a slower rate than that of the shaft 21 but in the same direction. The output shaft which is fixed with respect to the face plate 36 will of course move in the same direction and at the same speed.

If the purpose is to reverse the movement of shaft 31, the housing assembly B is held stationary and this in turn holds the gear 29 stationary. When gear 29 is held stationary the assembly comprising the gears 39 and 41 orbits around the gear 29, thereby carrying the assembly of which these gears form a part in a reverse direction. Since the face plate 36 and shaft 31 are a part of the same assembly as the planetary gears, the shaft 31 will also be rotated. The rate of reverse rotation of shaft 31 is, of course, determined by the selected gear ratios.

Referring now to the embodiment of the invention shown in FIG. 6, an input shaft 46 has a driving gear 47, integral therewith. Shaft 46 is journaled in a sleeve 48 threaded into the gear housing member 49, and a sun gear 51 carried by sleeve 48 is axially aligned with but displaced with respect to the drive gear 47. The input shaft 46 and the driving gear 47 may be thought of as comprising one sub-assembly, while the sleeve 48, rear housing member 49 and gear 51 may be considered as representing a second sub-assembly. A forward housing member 52 has an output shaft 53 journaled in it in longitudinal alignment with input shaft 46. A sun gear 54 integral with shaft 53 is carried on the inner end of output shaft 53. The output shaft 53 and gear 54 may be thought of as comprising a third sub-assembly.

A face plate 56, with a hub 57 surrounding the sleeve 48, is spaced from an inner face 58 of the forward housing member 52; and a plurality of planet gear assemblies, each comprising three axially aligned planetary gears 61, 62 and 63, are mounted between the face plate 56 and the face 58 by threaded studs 64 extending through the face plate and threaded into the forward housing member 52. The planet gears 61, 62 and 63 have a common hub so that they turn as a unit. They are respectively in mesh relation with gear 51 which is carried on sleeve 48 and is in effect a part of the rear housing sub-assembly; with drive gear 47 which is integral with input shaft 46, and with gear 54 which is integral with the output shaft 53. It will be noted that in this embodiment there is no ring gear but only a series of planetary gears, each comprising three axially aligned gears which are in mesh relationship with aligned sun gears connected respectively to the rear housing assembly, the input shaft and the output shaft. The forward housing member 52, the face plate 56 and the three planetary gear assemblies comprise a fourth sub-assembly.

As in the previously described embodiment, when the forward housing assembly A is grasped, the output shaft will be driven in the same direction as the input shaft; and when the rear housing assembly is grasped, the output shaft will be driven in a reverse direction. The manner in which this action occurs is as follows. When the housing member 52 is restrained from movement, no orbiting movement of the planetary gear assembly is possible. At such a time, there is accordingly a direct drive from gear 47 through gears 62 and 63 and thence to gear 54 which is integral with the output shaft. The effect is as if the planetary gears were mere idler gears, and the two active gears 47 and 54 will, therefore, rotate in the same direction. The operation in other words is like an ordinary set of spur gears in which the speed of rotation is determined entirely by the gear ratio. When the housing assembly B is held stationary, however, the forward housing member 52 is free to rotate in response to drive action of the gear 54. The tendency then would be for the gear 47 to move the planetary gears rotatably and bodily about the axis of shaft 46; but since planetary gear 61 is in mesh with gear 51 and this gear is being held stationary because it is part of the rear housing assembly, then the planetary gear assemblies are orbited around the drive axis and also rotate around the axes of the studs 64. The result of partial rotation of the assembly including gear 63 is for it to drive gear 54 and shaft 53 in a reverse direction.

In the embodiment of the invention shown in FIG. 7, an input shaft 66 is journaled in an annular block 67 carried by a rear housing member 68. Within the housing and integral with input shaft 66 are two driving sun gears 69 and 71, the latter being the smaller of the two gears. The input shaft 66 and the gears 69 and 71 may be considered as representing one sub-assembly since they turn as a unit.

The annular block 67 is secured in position on the rear housing member 68 by cap screws 72, and has mounted on its inner face a plurality of planet gears 73 meshing with drive gear 69. The rear housing member 68, annular block 67 and planet gears 73 may be considered a second sub-assembly because they move as a unit.

A forward housing member 76 forms a journal for an output shaft 77, and also carries on its inner annular face adjacent the rear housing member, an annular insert 78 which forms a pair of ring gears 79 and 81. An annular retainer 82 secured to the insert 78 by bolts 83 holds the annular block 67 in assembled relation. The forward housing member 76, insert 78 carrying the ring gears, and retainer block 82 may be thought of as comprising a third sub-assembly since they move as a unit.

A face plate 84 is integral with the inner end of output shaft 77 and carries a plurality of planetary gears 86 on studs 87. While the planetary gears 73 mesh with the larger drive gear 69, the planetary gears 86 mesh with the smaller drive gear 71. The output shaft 77, face plate 84 and planetary gears 86 may be considered as a fourth sub-assembly since they operate as a unit.

As in previous embodiments the output shaft 77 is driven in a forward direction when the housing assembly A is held immovable and in a reverse direction when the housing assembly B is held immovable. When the forward housing member 76 is held, gear 71 causes the planet gears 86 to orbit carrying face plate 84 and shaft 77 with them in a forward direction. Since the rear housing member is not being held, the planetary gears 73 will also orbit because of their contact with the drive gear 69 but the movement will be faster than in the case of the planetary gears 86 because of the gear ratios involved. When the rear housing member 68 is held, however, the planetary gears cannot orbit because they are also held stationary being part of the sub-assembly which includes the rear housing member 68. Thus, the ring gears 79 and 81 are driven in a reverse direction by rotation of the gears 73 on their axes. At the same time, planet gears 86 are being driven by drive gear 71. Since the gear ratio between gear 69 and ring gear 79 is less than the gear ratio between gear 71 and ring gear 81, the resulting reverse rotation of ring gears 79 and 81 will be at a higher speed than the simultaneous forward rotation of face plate 84 and output shaft 77 as produced by gear 71. Thus, the higher speed reverse rotation of ring gears 79 and 81 will carry planetary gears 86 and face plate 84 with them in a reverse orbit, and thus rotate output shaft 77 in a reverse direction.

From the above detailed description of the several embodiments of the invention it should at once be apparent that while they are specifically different in structural details they have common features. The first common feature obviously is the discussed functional relationship of parts, such that holding the forward housing member will cause the output shaft to rotate in the same direction as the input shaft but at a speed determined by the resultant ratios between the input and output shafts. Conversely, when the rear housing member is held against rotation, the output shaft rotates in a direction reverse to that of the input shaft and at a speed determined by the resultant gear ratios between the input and output shafts.

The similarity of concept and design among the embodiments is also evident from the fact that contrary to many drive mechanisms of this general character adjustable to provide reverse drive means, the input shaft and output shaft may be reversed to drive the units in a direction opposite to that for which they were primarily designed and the essential functions of the invention are still obtained. Considering for example the embodiment shown in FIG. 6, if assumption were made that shaft 53 were the power input shaft then if housing assembly A were held stationary the planet gears would act as ordinary spur gears and would drive shaft 46 in the same direction that shaft 53 was rotating. If now housing assembly B were held stationary, then gear 51 also being stationary the planet gears would be caused to orbit around such gear. Because of the gear ratios involved, planet gears 62 would cause the gear 47 to be rotated but in a direction opposite to that in which the input shaft 53 was rotating.

Another characteristic which is common to the several embodiments of the invention is that when the forward housing portion is held stationary to produce a direct drive, such direct drive is accomplished by providing an effective single idler gear function between the two shafts; thus accomplishing, as in all cases where a single idler gear is used, a drive from the input shaft to the output shaft in the same direction, the speed of the output shaft being determined directly by the gear ratios involved. This virtual idler gear function is independent of structure. Thus in the FIG. 3 embodiment, gear 22 drives the planet gear 41; but since the ring gear 34 with which gear 41 is also in mesh is held stationary, the function resulting from the arrangement is exactly the same as if a single idler gear were interposed between gears carried by the two shafts. In FIG. 6 this function is still more clearly observable in that when drive gear 47 drives gear 62 which is held stationary with the forward housing portion to prevent its orbiting, the planet gear system operates exactly as a single idler gear and imparts rotation to the output shaft through gear 54 in the same direction as the rotation of the input shaft. In FIG. 7, the drive from gear 71 through the planet gears 81 produces a virtual idler function in the same manner as described in connection with FIG. 3.

When the drive of the output shaft is in the reverse direction, in each instance gear means are provided operable between the input shaft and the output shaft as a true planetary system to impart reverse drive movement to the output shaft. Looking at FIG. 3 the gear 29 being held stationary, planet gears 39 orbit around it in the same manner as they would if they were in mesh with a stationary ring gear. Even though planet gears 41 are also in mesh with the ring gear 34, this gear linkage is ineffective to produce any functional drive result because the forward housing portion is free to rotate in either direction which the several gear ratios involved in a particular design would cause it to rotate. With gear 29 stationary, however, gears 39 orbit but in a reverse direction with respect to the input shaft, thereby carrying with them the assembly including the planetary gears, the face plate 36 and the output shaft 31. This same result occurs in the FIG. 6 embodiment because gear 51 being stationary when the rear housing portion is held against rotation, the planetary system is caused to orbit around gear 51 and through the ratios of the several gears involved to drive gear 54 and output shaft 53 in a reverse direction. In the FIG. 7 embodiment a planetary action also occurs when the drive is in reverse because gears 73 being driven by gear 69 and being held stationary cause the ring gears to be driven in reverse direction, and the ring gears in turn cause an orbiting of the planet gears 86 in a reverse direction carrying with them the face plate 84 and the shaft 77. Thus, regardless of the structure the forward movement is in effect the movement of an idler spur gear system even though a planet gear may be involved, and the reverse movement is the action of a planetary system with the resultant reverse drive action of the output shaft associated with the planetary system.

Attention is called to the fact that in each of the embodiments I employ a plurality of planetary gears, optionally three, for each planetary gear system. This is for balance and to secure other advantages, but obviously all that is necessary in any embodiment of the invention to produce a given function is a sun gear, a single planetary gear and a ring gear or functionally equivalent member. Also the particular disposition of face plates and the like by means of which a gear or gear system may be associated either with the forward or rear housing portion is a structural detail which may be modified with design.

While my invention is not particularly concerned with the manner of servicing and maintaining the units of the present invention, it will be noted that the drawings show the use of conventional type oil seals and the like permitting the housing to be filled with suitable lubricant so that it may be operated indefinitely without maintenance. The parts are, never the less, arranged so that if for any reason it becomes essential to service or adjust any part of the mechanism such action may be accomplished with ordinary hand tools.

Throughout the description I have used conventional terms such as housing, face plate, forward and rear housing assemblies, and the like to explain clearly the relationship of the parts. These words are used in a descriptive sense to identify the functions involved and are not to be construed as limitations except as such limitations are specifically defined in the claims.

I claim:
1. A reversible drive mechanism comprising
  (a) a housing having forward and rear portions,
  (b) an input shaft journaled in the rear housing portion,
  (c) an output shaft journaled in the forward housing portion,
  (d) a ring gear within the forward housing portion and integral therewith,

(e) a face plate within the forward housing portion integral with the output shaft,
(f) a driving gear on said input shaft,
(g) a sun gear within and secured to the rear housing portion in concentric relation with said input shaft,
(h) a pair of concentric functionally integral planetary gears carried by said face plate in mesh with said sun gear and driving gear respectively, one of said planetary gears meshing also with said ring gear,
(i) the relation of such gears causing said planetary gears to orbit and carry the output shaft with them when the forward housing portion is held stationary and to orbit in a reverse direction to rotate the face plate and output shaft in an opposite direction when said rear housing portion is held stationary.

2. A reversible drive mechanism comprising a housing having forward and rear portions, an input shaft journalled in the rear housing portion, said input shaft having an exterior shank shaped for engagement by a driving clutch, an output shaft journalled in the forward housing portion, said output shaft having a chuck exterior of the housing for receipt of a shank of a small hand tool, a ring gear within the forward housing portion and integral therewith, a face plate within the forward housing portion integral with the output shaft, a driving gear within the rear housing portion and secured to said input shaft, a sun gear secured to the rear housing portion concentric with but spaced from said driving gear, and a pair of integral and axially aligned planetary gears carried by the face plate meshing with said driving gear and sun gear respectively one of such pair of planetary gears meshing with said ring gear, whereby when the forward housing portion is held stationary the output shaft will be driven in one direction and when the rear housing portion is held stationary, the said output shaft will be driven in an opposite direction.

3. A reversible drive mechanism for a portable hand tool, said mechanism comprising
(a) a housing having forward and rear portions,
(b) an input shaft journaled in said rear housing portion, said input shaft having an exterior shank shaped for engagement by a driving clutch,
(c) an output shaft journalled in said forward housing portion, said output shaft having a chuck exterior of the housing for receipt of a shank of a small hand tool,
(d) a ring gear within the forward housing portion and integral therewith,
(e) a face plate within the housing functionally integral with said output shaft,
(f) a driving gear within the housing functionally integral and concentric with the input shaft,
(g) a sun gear carried by said rear housing portion, spaced from but concentric with said driving gear,
(h) said sun gear being a larger diameter and having a larger number of teeth than said driving gear,
(i) at least one pair of mutually axially aligned, functionally integral planetary gears carried by said face plate, one of said pair of planetary gears being of relatively larger diameter and one of relatively smaller diameter,
(j) said larger diameter planetary gear meshing with said ring gear and said driving gear,
(k) said relatively smaller diameter planetary gear meshing with said sun gear,
(l) whereby holding said forward housing portion stationary with the hand will cause forward rotation of said output shaft, and holding said rear housing portion stationary with the hand will cause reverse rotation of said output shaft.

4. A reversible drive unit for small power tools comprising
(a) a pair of cup-shaped members defining a housing with said cup-shaped members forming forward and rear housing portions, and each such housing portions having an end portion and an integral annular side portion,
(b) a first face plate secured to the end portion within said rear housing member,
(c) a sleeve secured to said face plate,
(d) an input shaft journaled in and through said sleeve and face plate, said input shaft having an exterior shank shaped for engagement by a driving clutch,
(e) a driving gear carried on the input shaft within the housing,
(f) a sun gear carried by said sleeve spaced from the driving gear but in axial relation thereto, said sun gear having a larger diameter than said driving gear,
(g) an output shaft journaled in said forward housing portion in alignment with but having its inner end spaced from the input shaft, said output shaft having a chuck exterior of the housing for receipt of a shank of a small hand tool,
(h) a second face plate carried by said output shaft within the housing in a plane at right angles to the output shaft axis,
(i) a third face plate secured to said second face plate in parallel relation to said second face plate to bridge a space containing said driving gear and sun gear,
(j) an internal ring gear carried by the forward housing portion in alignment with said driving gear,
(k) a pair of functionally integral planetary gears of relatively smaller and larger diameter rotatably supported between said second and third face plates, said smaller gear of said pair meshing with the sun gear, and said larger gear of said pair meshing with both the driving gear and the ring gear, and
(l) whereby when the forward housing portion is held stationary said output shaft will rotate in the same direction as the input shaft, and when the rear housing portion is held stationary, the said output shaft will be rotated in a reverse direction.

References Cited in the file of this patent

UNITED STATES PATENTS

| | | |
|---|---|---|
| 2,005,726 | Banker | June 25, 1935 |
| 2,603,110 | Kirkpatrick | July 15, 1952 |
| 2,694,470 | Gendron | Nov. 16, 1954 |
| 2,780,944 | Ondeck | Feb. 12, 1957 |
| 2,851,907 | Normanville | Sept. 16, 1958 |
| 2,941,420 | Graybill | June 21, 1960 |
| 2,953,946 | Simpson | Sept. 27, 1960 |

FOREIGN PATENTS

| | | |
|---|---|---|
| 384,880 | France | Feb. 18, 1908 |
| 701,435 | Germany | Jan. 16, 1941 |